United States Patent Office 3,496,042
Patented Feb. 17, 1970

3,496,042
PROCESS FOR MAKING A POROUS POLY-
URETHANE-FABRIC LAMINATE
Keith Gordon Wyness, Dagenham Dock, Essex, England,
assignor to Porvair Limited, London, England
No Drawing. Filed Mar. 30, 1966, Ser. No. 538,540
Int. Cl. B32b 5/18, 31/14
U.S. Cl. 156—77                                    3 Claims

ABSTRACT OF THE DISCLOSURE

A porous material is disclosed which comprises at least two sheets of textile materials which may be woven, knitted, or non-woven and which are firmly bonded together by a continuous porous layer of polymeric adhesive. To produce the porous material an adhesive mixture comprising a solid filler dispersed through a solution of an adhesive polymeric material is applied to one side of one or both or the sheets of textile material after which the two sheets are brought together such that the adhesive mixture is retained between the two sheets. The solvent for the adhesive but in which the filler is insoluble is then removed by heat after which the filler itself embedded in the adhesive is removed by a leaching process.

---

This invention relates to the production of porous materials comprising at least two porous sheet materials selected from the class consisting of woven, knitted, and non-woven textile materials joined together by a porous. The resultant composite bodies although having an appreciable vapour permeability, have a lower permeability also to water than any one of the sheet materials from which they are made. In addition, such sheet materials have at least one surface possessing a woven textile appearance and are thus particularly suitable for use in the production of rainwear and other forms of waterproof clothing.

According to the present invention a method of making a porous material comprising at least two sheet materials selected from the class consisting of woven, knitted and non-woven textile materials firmly adhered to each other by a continuous porous layer of polymeric adhesive material is characterised in that the adhesive layer is prepared by forming a mixture comprising the polymeric adhesive material dissolved in a solvent, with a finely divided removable solid filler evenly dispersed therein, for example a water soluble material such as sodium chloride, applying a layer of the mixture to at least one of the sheets, and placing the sheets in contact so that a layer of the mixture is formed between the sheets, and removing the solvent by heating and the removable filler from the resulting composite body by leaching, for example with water, so as to form the adhesive layer.

The textile materials are preferably made from staple fibres. The fibres may be nylon, Terylene, cotton or rayon fibres.

The invention is not dependent on any particular theory as to the way in which the adhesion between the porous sheets is achieved or on any particular theory as to the way in which the vapour permeability of the adhesive layer is achieved.

With regard to the adhesion, it is believed that some or all of the following factors are involved, the relative importance varying according to the nature of the porous sheets being joined together:

(1) Physical interlocking between the adhesive layers and the porous sheets which, it is believed, is assisted by the use of staple fibres rather than continuous filament fibres. The following adhesive working materials have been found to be particularly suitable for use with staple fibres: plasticised polyvinyl chloride, a polyurethane cross linked in situ.

(2) Chemical bonding between any unreacted isocyanate groups in a polyurethane adhesive working material with reactive hydrogen groups in the materials forming the porous sheets, for example, amide groups in nylon.

As will be appreciated for factor 1 when the porous sheets consist of continuous filament fibres it is desirable to choose the materials from which these are formed and the adhesive working material so that factor 2 may be expected to be involved.

(3) Diaphragms and filaments connecting the porous sheets to the adhesive layer, formed, it is believed when the solvent is removed, as a result of the use of solvents for the adhesive working material which are also at least partially solvents for the materials of the porous sheets, resulting in partial dissolution of the sheet materials on heating to remove the solvent and partial mixture in solution of the two materials.

In one form of the invention the adhesive working material may be a polyurethane.

Thus bearing in mind possible factor 2 above the materials forming the sheets, which will be termed the sheet working materials, may be chosen to comprise chemical compounds having molecules containing groups capable of interacting with groups contained in the molecules of the adhesive working material. The groups of the sheet working material may comprise groups containing active hydrogen atoms capable of reacting with isocyanate groups and the groups of the adhesive working material may include isocyanate groups. Thus the or each sheet working material may comprise nylon and the adhesive working material may be a polyurethane having some free isocyanate groups.

The term polyurethane is to be understood in its broadest sense and includes any material derived from the reaction, or a reaction product of a reaction, between an isocyanate, such as a diisocyanate, and a molecule, which will be called the polyurethane precursor, which should generally be a polymeric molecule, containing at least two groups, such as hydroxyl, amido, or amino groups, which contain hydrogen atoms capable of reaction with an isocyanate group. The polyurethane precursor may be a polyester derivative, or a polyether diol, or a polyester amide.

The polyurethane used as the adhesive working material may be a thermoplastic elastomer having a low degree of cross-linking, and may be a predominantly linear polymer, and may have an average molecular weight in the range 20,000 to 300,000. The polyurethane may be derived from a polyester.

Polyurethanes of the type disclosed and claimed in British Patent No. 1,035,172 are particularly suitable.

The adhesive layer may contain a wetting agent comprising a sodium salt of the bis alkyl sulphosuccinates in which the alkyl groups are the isobutyl, methylamyl, octyl, nonyl, or tridecyl groups.

Alternatively the adhesive layer may contain a proofing agent comprising a long chain polymer of dialkyl or aryl alkyl siloxane units, which will be referred to as a proofing agent of the type specified, which renders the tie layer hydrophobic or water repellent. The proofing agent may have the same composition as the proprietary material sold under the name Silicone M.492 or that sold under the name Silicone R.205, by Midland Silicones Limited.

It will be appreciated that the lower permeability to liquid water, which may be provided in porous materials made according to the present invention as previously referred to is due to porous adhesive layer and its resultant resistance to the ingress of liquid water rather than to any decrease in the permeability of the porous sheets themselves.

Thus if the porous material is to have a low liquid water permeability in the absence of a proofing agent, the pores in the adhesive layer should have a diameter less than 100 microns and preferably less than 10 microns. The removable filler preferably has an average particle diameter line in the range 7–25 microns.

The invention is not dependent on any particular theory as to the way in which the pores are formed in the adhesive layer, but in general it is believed that the removal of the solvent while an adhesive layer is constrained between adjacent porous sheets so that it cannot contract freely in all directions, serves to break down the partitions or diaphragms by which the removable filler would otherwise tend to be encapsulated. It is thought that such shrinking while under constraint may be regarded as having somewhat the same effect as allowing the layer to shrink freely in all directions and then stretching it to its original size in one or more directions, thereby breaking down the encapsulation.

Under certain conditions, for example when the adhesive layer is relatively thick, shrinkage may be insufficient to break down encapsulation of the removable filler.

In this case the composite body may be calendered before the removal of the removable filler. The calendering, it is believed, results in the membranes enclosing the filler being ruptured, enabling the filler to be leached out, leaving a labyrinth of interconnected pores of a size of the same order as that of the filler particles.

In another form of the invention the adhesive working material may be made in situ by reaction in the mixture.

Thus the working material may be made from a polyurethane prepolymer, which is chain-extended in situ. The polyurethane prepolymer may be a liquid polyurethane elastomer, for example the proprietary material supplied by Du Pont (U.K.) Limited under the name Adiprene dissolved in a suitable solvent, and may be chain-extended by reaction with a material comprising a diamine, which may be aliphatic, for example, diamino hexane, or aromatic, for example 4-4'-methylene-bis-(2 chloroaniline). An example of a material comprising 4-4'-methylene-bis-(2 chloroaniline) is the proprietary material supplied by Du Pont (U.K.) Limited under the name Moca. An example of a material comprising an aromatic diamine is the proprietary material supplied as Shell curing agent Epicure Z, which can be mixed with diamino hexane to produce a modified chain extending agent including diamino hexane and Shell curing agent Epicure Z.

If heat is used to remove the solvent it may be sufficient to cure the polyurethane.

The polyurethane may be allowed to cure for a further length of time, for example at an elevated temperature, for example 90° C., for example in the case of Moca for 5 days, but in the case of Epicure Z or diamino hexane, for 24 hours, prior to the removal of the removable filler.

Alternatively the adhesive working material may be a polyurethane capable of being cross-linked by an isocyanate cross-linking agent, and the adhesive mixture may containe such an adhesive working material and an isocyanate cross-linking agent and cross-linking may be allowed or caused to occur in situ in the adhesive layer. The adhesive working material may be a polyurethane containing unreacted active hydrogen groups.

As example of such a polyurethane is the proprietary polyurethane material sold under the name Daltoflex 2S. An example of a suitable cross-linking agent for use with Daltoflex 2S is the proprietary material sold under the name Superasec G.

Conveniently the adhesive mixture may comprise a mixture of solutions of Daltoflex 2S in cyclohexanone (for example a 50% by weight solution) and Suprasec G in ethyl acetate (for example a 75% by weight solution).

Bearing in mind possible factor 3 the solvent for the adhesive working material may be a partial solvent for the or each sheet working material.

If the composite body is to contain a surface active agent, the surface active agent may conveniently be present in the adhesive mixture, for example by being mixed with or dissolved in the solvent.

The invention may be put into practice in various ways but one specific embodiment will be described by way of example.

EXAMPLE

This is an example of the production of a woven textile composite sheet material having a high degree of vapour permeability and a liquid water permeability less than that of either of the sheets from which it is made.

The two porous bodies used are a woven sheet of slubbed rayon formed from staple rayon fibres and a woven cotton sheeting formed from staple cotton fibres.

The adhesive mixture has the following formulation all quantities being parts by weight.

Adhesive working material

Formed in situ from a polyurethan prepolymer (that sold under the trademark Daltoflex 2S, as a 50% solution in cyclohexanone)_____ 100
Cross-linking agent (that sold under the trademark Suprasec G, as a 75% solution in ethyl acetate)_ 10

Removable filler

Sodium chloride (ground to a particle size substantially in the range 7–25 microns)_____ 100

Additional solvent for the adhesive working material

Cyclohexanone _____ 25

The adhesive mixture is intimately mixed in a suitable mixer such as a paint mill and minor proportions of additives are added as desired. These may include colouring compounds up to for example 5 parts by weight and surface active agents for example a proofing agent up to about 3 parts by weight.

A suitable proofing agent is that sold under the name Silicone M 492.

The mixture is then knife coated onto the cotton sheeting so as to form a continuous layer which may be about 1 or 2 mils thick. The rayon sheet is then laid on top of the layer of adhesive mixture before the solvents are removed from the mixture. The composite sheet material is then dried and cured at 90° C. for 10 minutes, allowed to post cure for a suitable length of time, for example 24 hours, at a suitable temperature, for example 25° C., and then immersed in water at 60° C. for 30 minutes to remove substantially all of the removable filler. The resultant composite sheet material has a pleasing textile appearance and is suitable for use as a weather-proof garment or footwear material. Thus it has a substantial vapour permeability while at the same time being substantially impermeable to liquid water.

Materials having the properties set out in the following table were obtained when the above formulation was used in conjunction with the porous bodies indicated.

| Porous body (laminated to a woven cotton duck in each case) | Nominal adhesive thickness before solvent removal (mils) | Water vapour permeability in gms. $H_2O$/ sq. metre/ 24 hours at 37° C. | Suter hydrostatic head, cm. Hg |
|---|---|---|---|
| Slubbed rayon | 10 | 2,290 | 1 |
| Do | 20 | 1,600 | 4 |
| Nylon twill | 10 | 1,450 | 1 |
| Do | 20 | 620 | 20 |
| Weft stretch nylon | 10 | 2,590 | 1 |
| Do | 20 | 1,040 | 18 |

What I claim as my invention and desire to secure by Letters Patent is:

1. A method of making a water vapor permeable material comprising at least two porous sheets consisting of woven, knitted or non-woven textile materials, firmly bonded to each other by a continuous porous adhesive layer of polyurethane, said method consisting of the steps of forming a mixture comprising a polyurethane with a low degree of cross-linking dissolved in a solvent with a finely divided removable solid filler having a particle size in the range 7 to 25 microns evenly dispersed therein, applying said mixture to at least one of said sheets as a layer in the range 0.010" to 0.020" thick and placing the sheets in contact so that said layer of the mixture is located between the sheets, cross-linking said layer of polyurethane in situ and removing the solvent by heating and subsequently the removable filler by leaching so as to form a porous adhesive layer firmly bonding said porous sheets to each other.

2. A method as claimed in claim 1 in which the thermoplastic elastomeric polyurethane is derived from a polyester and has some free isocyanate groups but a low degree of cross-linking and the heating to remove the solvent effects cross-linking in situ.

3. A method as claimed in claim 1 in which said mixture comprises a polyurethane capable of being cross-linked by an isocyanate cross-linking agent and an isocyanate cross-linking agent and cross-linking is effected in situ in the adhesive layer.

References Cited

UNITED STATES PATENTS

| | | | |
|---|---|---|---|
| 2,603,575 | 7/1952 | Schramm | 161—156 X |
| 2,700,694 | 1/1955 | Fernald | 136—146 |
| 2,894,289 | 7/1959 | Harper et al. | 18—57 |
| 2,983,960 | 5/1961 | Jilge | 156—155 X |
| 3,100,721 | 8/1963 | Holden | 117—135.5 |

ROBERT F. BURNETT, Primary Examiner

M. A. LITMAN, Assistant Examiner

U.S. Cl. X.R.

117—63; 156—155; 161—82, 83, 89, 98, 158, 159